US008721096B2

(12) United States Patent
Park

(10) Patent No.: US 8,721,096 B2
(45) Date of Patent: May 13, 2014

(54) BACKLIGHT UNIT OF LIQUID CRYSTAL DISPLAY DEVICE AND METHOD FOR DRIVING THE SAME

(75) Inventor: Hee Jeong Park, Bucheon-shi (KR)

(73) Assignee: LG Display Co., Ltd., Seoul (KR)

( * ) Notice: Subject to any disclaimer, the term of this patent is extended or adjusted under 35 U.S.C. 154(b) by 144 days.

(21) Appl. No.: 11/168,959

(22) Filed: Jun. 28, 2005

(65) Prior Publication Data

US 2006/0007112 A1 Jan. 12, 2006

(30) Foreign Application Priority Data

Jun. 29, 2004 (KR) ........................ 10-2004-0049513

(51) Int. Cl.
*G01D 11/28* (2006.01)

(52) U.S. Cl.
USPC ....... 362/23.09; 362/23.1; 362/600; 362/612; 362/613; 362/231

(58) Field of Classification Search
USPC ............. 362/26, 27, 600, 611, 612, 613, 231, 362/23.09, 23.1; 349/61-63, 69-71; 345/88, 89, 102, 690; 315/169.3, 315/169.4, 185 S, 200 A
See application file for complete search history.

(56) References Cited

U.S. PATENT DOCUMENTS

| | | | | |
|---|---|---|---|---|
| 5,986,628 | A * | 11/1999 | Tuenge et al. | 345/76 |
| 6,243,713 | B1 * | 6/2001 | Nelson et al. | 707/104.1 |
| 6,480,682 | B1 * | 11/2002 | Kamata | 396/542 |
| 6,969,189 | B2 * | 11/2005 | Lee et al. | 362/631 |
| 7,009,343 | B2 * | 3/2006 | Lim et al. | 315/150 |
| 2002/0175632 | A1 * | 11/2002 | Takeguchi | 315/169.1 |

FOREIGN PATENT DOCUMENTS

JP 2002-350846 12/2002

OTHER PUBLICATIONS

Office Action issued in corresponding Korean Patent Application No. 10-2004-0049513; mailed Aug. 31, 2010.

* cited by examiner

*Primary Examiner* — Jong-Suk (James) Lee
*Assistant Examiner* — Mark Tsidulko
(74) *Attorney, Agent, or Firm* — Brinks Gilson & Lione

(57) ABSTRACT

A backlight unit of an LCD device includes a first light source unit including a plurality of red, green and blue LEDs and a second light source unit including a plurality of white LEDs, the white LED provided between each of the first light source unit. A control unit divides the plurality of first and second light source units into a plurality of blocks and outputs control signals to the first and second light source units by detecting the luminance of inputted video signals. The backlight unit includes a first light source driving unit for driving the first light source and a second light source driving unit for driving the second light source by corresponding block to the first light source unit.

2 Claims, 7 Drawing Sheets

BACKLIGHT UNIT OF LIQUID CRYSTAL DISPLAY DEVICE AND METHOD FOR DRIVING THE SAME

This application claims the benefit of the Korean Application No. P2004-49513 filed on Jun. 29, 2004, which is hereby incorporated by reference as if fully set forth herein.

BACKGROUND OF THE INVENTION

1. Field of the Invention

The present invention relates to a liquid crystal display (LCD) device, and more particularly, a backlight unit of an LCD device for improving light efficiency and color realization ratio.

2. Discussion of the Related Art

A Cathode Ray Tube (CRT), one of flat display devices, has been widely used for monitors of a television, a measuring machine and an information terminal. However, the CRT has limitations to miniaturization and lightness in weight due to a size and a weight in itself. Accordingly, display devices such as a liquid crystal display (LCD) device using an electro-optics effect, a plasma display panel (PDP) using a gas discharge and an Electroluminescence display (ELD) device using an electro-luminescence effect have been actively studied, which can substitute for the CRT.

Among the display devices, the LCD device is most actively studied, so that the LCD device having low power consumption, thin profile and lightness in weight is highly developed for being applied to monitors for a desktop computer and a large sized display device as well as for a laptop computer. Accordingly, demands for the LCD devices continuously increase.

Herein, the LCD device includes an LCD panel for displaying a picture image, and a driving part for applying a driving signal to the LCD panel. The LCD panel has first and second glass substrates bonded to each other at a predetermined interval, and a liquid crystal layer injected between the first and second glass substrates.

On the first glass substrate (TFT array substrate), there are a plurality of gate lines arranged in a first direction at fixed intervals, a plurality of data lines arranged in a second direction for being in perpendicular to the gate lines at fixed intervals, a plurality of pixel electrodes in respective pixel regions defined by the gate lines and the data lines in a matrix type, and a plurality of thin film transistors (TFTs) switchable in response to signals on the gate lines for transmission of signals on the data line to the pixel electrodes.

The second glass substrate (color filter substrate) has a black matrix layer for shielding light from areas excluding the pixel regions, a color filter layer (R, G, B) for displaying colors, and a common electrode for implementing a picture image.

The foregoing first and second glass substrates have a predetermined gap by spacers, and the first and second glass substrates are bonded by a sealant having a liquid crystal injection inlet. Then, liquid crystal is injected through the liquid crystal injection inlet.

Meanwhile, the LCD device controls transmittance of ambient light to display the picture image. In this respect, the LCD device requires an additional light source such as a backlight. The backlight is classified into a direct-type method and an edge-type method according to a position of a lamp unit.

The LCD device uses the light source such as an Electro Luminescence (EL), a Light Emitting Diode (LED), a Cold Cathode Fluorescent Lamp (CCFL) or a Hot Cathode Fluorescent Lamp (HCFL). Especially, the CCFL having long lifetime, low power consumption and thin profile is used as the light source for a large sized color TFT LCD device.

In case of the CCFL method, a fluorescent discharge tube is used for using a penning effect, which is formed by injecting a hydrargyrum gas containing Argon Ar and Neon Ne at a low temperature. Also, electrodes are formed at both ends of the fluorescent discharge tube, and the cathode is formed in a plate-shape. When a voltage is applied thereto, electric charges inside the fluorescent discharge tube collide against the plate-shaped cathode like a sputtering state, thereby generating secondary electrons. Thus, circumferential elements are excited by the secondary electrons, whereby plasma is generated. Also, the circumferential elements emit strong ultraviolet rays, and then the ultraviolet rays excite a fluorescent substance, thereby emitting visible rays.

In the edge-type method, a lamp unit is formed at one side of a light-guiding plate. The lamp unit includes a lamp, a lamp holder and a lamp reflecting plate. The lamp for emitting light is inserted into both sides of the lamp holder, whereby the lamp is protected from an external impact. Also, the lamp reflecting plate covers a circumferential surface of the lamp, and one side of the lamp reflecting plate is inserted to one side of the light-guiding plate to reflect the light emitted from the lamp to the light-guiding plate. Generally, the edge-type method for forming the lamp unit at the one side of the light-guiding plate is applied to relatively small sized LCD devices such as the monitors for the laptop type computer or the desktop type computer. The edge-type method is useful to obtain uniform luminance, long lifetime and thin profile in the LCD device.

With trend of the large-sized LCD device of 20-inch or more, the direct-type method is actively developed, in which a plurality of lamps are formed in one line on a lower surface of a light-diffusion plate, whereby the entire surface of the LCD panel is directly illuminated with the light. The direct-type method, which has greater light efficiency as compared with that of the edge-type method, is used for the large-sized LCD device requiring high luminance.

Hereinafter, a related art backlight assembly will be described as follows.

FIG. 1 is a schematic view for illustrating the related art backlight assembly.

As shown in FIG. 1, the related art backlight assembly includes a fluorescent lamp 1, a light-guiding plate 2, a light-diffusion substance 3, a reflecting plate 4, a light-diffusion plate 5 and a prism sheet 6. When a voltage is applied to the fluorescent lamp 1, electrons remaining in the fluorescent lamp 1 move to the anode, and the remaining electrons collide with argon Ar, whereby the argon Ar is excited. As a result, positive ions are generated, and the positive ions collide against the cathode, thereby generating secondary electrons. When the secondary electrons are discharged to the fluorescent lamp 1, the flow of the electrons collides with hydrargyrum vapor, and then ionized, thereby emitting ultraviolet rays and visible rays. Then, the emitted ultraviolet rays excite a fluorescent substance deposited inside the fluorescent lamp, thereby emitting light.

Subsequently, the light-guiding plate 2 is Wave-Guide to make the light emitted from the fluorescent lamp 1 be incident on the inside, and to emit a plate type light source. That is, the light-guiding plate 2 is formed of Poly Methyl Meth Acrylate (PMMA) having the great light transmittance. The light incidence of the light-guiding plate 2 is related with a ratio of the light-guiding plate thickness to the fluorescent lamp diameter, a distance between the light-guiding plate and the fluorescent lamp 1, and the shape of the reflecting plate. Generally, the fluorescent lamp 1 is slant on the center of the light-guiding plate 2 at the thickness direction, thereby improving the efficiency of light incidence. The light-guiding plate 2 for the backlight unit of the LCD device is divided into a printing-type light-guiding plate, a V-cut type light-guiding plate, and a scattering-type light-guiding plate.

Next, the light-diffusion substance 3 is comprised of $SiO_2$ particles, PMMA and solvent. At this time, $SiO_2$ particles having porosity are used for diffusing the light. Also, PMMA is used for adhering $SiO_2$ particles to a lower surface of the light-guiding plate 2. The light-diffusion substance 3 is deposited on the lower surface of the light-guiding plate 2 in the dotted patterns, and the sizes of the dotted patterns are gradually increased to obtain a uniform plate-type light source on an upper surface of the light-guiding plate 2. That is, the dotted pattern has a small size in a unit area near to the fluorescent lamp 1, and the dotted pattern has a large size in a unit area apart from the fluorescent lamp 1. At this time, the shape of the dotted pattern may be varied. In case of the dotted patterns having the same size, the respective dotted patterns have the luminance of the same level regardless of the dotted shape.

The reflecting plate 4 is formed at the rear of the light-guiding plate 2, whereby the light emitted from the fluorescent lamp 1 is incident on the inside of the light-guiding plate 2. Also, the light-diffusion plate 5 is formed on the upper surface of the light-guiding plate 2, on which the dotted patterns are deposited, to obtain a uniform luminance at each viewing angle. The light-diffusion plate 5 is formed of PET or Poly Carbonate (PC) resin, and a particle-coating layer is formed on the light-diffusion plate 5 for diffusing the light.

Next, the prism sheet 6 is formed to improve the frontal luminance of the light transmitted and reflected to the upper side of the light-diffusion plate 5. That is, the prism sheet 6 transmits the light of the predetermined angle, and the light incident on the other angles is totally reflected, whereby the light is reflected to the lower side of the prism sheet 6 by the reflecting plate 4 formed on the lower side of the light-guiding plate 2. The backlight assembly having the aforementioned structure is fixed to a mold frame, and a display unit disposed at an upper side of the backlight assembly is protected by a top sash. Also, the backlight assembly and the display unit are received between the top sash and the mold frame being coupled to each other.

Hereinafter, a backlight unit of an LCD device according to the related art will be described with reference to the accompanying drawings. FIG. 2 is a perspective view for illustrating a backlight unit using a related art fluorescent lamp.

As shown in FIG. 2, the backlight unit includes a fluorescent lamp 11, a lamp housing 12, a light-guiding plate 13, a reflecting plate 14, a light-diffusion plate 15, a prism sneet 16, a protection sheet 17, and a main supporter 18. At this time, a fluorescent substance is coated on the inner surface of the fluorescent lamp 11 for emitting the light. Also, the lamp housing 12 fixes the fluorescent lamp 11, and concentrates the light emitted from the fluorescent lamp 11 on one direction. The light-guiding plate 13 provides the light emitted from the fluorescent lamp 11 to an upper side of an LCD panel, and the reflecting plate 14 is provided at the rear of the light-guiding plate 13 to guide the light leaking in an opposite side of the LCD panel toward the light-guiding plate 13. The light-diffusion plate 15 is formed above the light-guiding plate 13 to uniformly diffuse the light emitted from the light-guiding plate 13. Also, the prism sheet 16 is formed above the light-diffusion plate 15 to concentrate the light diffused in the light-diffusion plate 15, and to transmit the concentrated light to the LCD panel, and the protection sheet 17 is formed on an upper side of the prism sheet 16 to protect the prism sheet 16. The main supporter 18 receives and fixes the aforementioned elements.

In the aforementioned backlight unit, the light emitted from the fluorescent lamp 11 is concentrated on an incident surface of the light-guiding plate 13, and then the concentrated light passes through the light-guiding plate 13, the light-diffusion plate 15 and the prism sheet 16, whereby the light is transmitted to the LCD panel. However, the backlight unit of using the related art fluorescent lamp has a low color realization ratio due to the emission characteristics of a light source. Also, it is hard to obtain the backlight unit having high luminance due to limits in size and capacity of the fluorescent lamp.

Meanwhile, the backlight unit has been used for illuminating the screen of the LCD device, whereby the viewer can read information displayed on the screen in the dark surroundings. Recently, in the light-guiding plate of the backlight unit, it is required to obtain a thin light-guiding plate, a function for displaying various colors, and a formation of a Light Emitting Diode (LED) to satisfy demands for excellent design, low power consumption and thin profile.

Recently, many efforts have been made to obtain the thinness in the light-guiding plate for satisfying demands of excellent design and low power consumption. In addition, the LCD device has been developing to have a function for displaying various colors and a technical development for decreasing the power consumption with LEDs (light-emitting diode).

FIG. 3 is a plane view for illustrating a backlight unit of using an LED (Light Emitting Diode) according to the related art. As shown in FIG. 3, a plurality of red R, green G, and blue B LEDs 23*a*, 23*b*, and 23*c* are arranged at fixed intervals on a PCB substrate 21 of the rear surface of an LCD panel (not shown), whereby a light source 23 for emitting the light is provided. The LCD panel (not shown) is illuminated with the light emitted from the light source 23. Accordingly, the LCD panel displays the image in the dark surroundings.

The light source 23 is formed by arranging the red R LED 23*a*, the green G LED 23*b* and the blue B LED in one-dimensional structure on the PCB substrate 21.

To display the picture image on the LCD panel of the aforementioned backlight unit, a voltage is applied to the red R, green G and blue B LEDs 23*a*, 23*b* and 23*c*, whereby the red R, green G and blue B LEDs 23*a*, 23*b* and 23*c* emit the red, green and blue light. The red, green and blue light is mixed, so that the rear surface of the LCD panel is illuminated with the white light.

FIG. 4 is a plane view for explaining the method of emitting the white light by color mixing in the backlight unit having the LED according to the related art. As shown in FIG. 4, the monochromatic light of R, G and B emitted from the respective LEDs 23*a*, 23*b* and 23*c* is mixed to generate the white light. However, in the zone of 'a', there is the predetermined portion wherein the light emitted from the respective LED lamps is not overlapped, so that it is impossible to generate the white light. In the zone of 'b', the monochromatic light of R, G and B emitted from the respective LEDs is mixed, whereby the white light is generated.

The LED is used for the light source of the backlight unit in the LCD panel, so that it is possible to obtain the low power consumption and miniaturization in electronic equipments such as notebook PC, etc.

However, it is hard to mix the red, green and blue light emitted from the respective red, green and blue LED lamps, and to generate the white light by uniformly mixing the three colors, thereby lowering the light efficiency and color realization ratio. Accordingly, an LCD device and a method for driving the LCD are needed that substantially obviates the limitations of the prior art.

SUMMARY OF THE INVENTION

A backlight unit of an LCD device may include a first light source unit that has a plurality of red, green and blue LEDs; a second light source unit that includes a plurality of white LEDs, wherein the white LED may be between each of the first light source unit. The backlight unit may include a control unit for dividing the plurality of red, green, blue and white LEDs into a plurality of blocks, to output control signals to the first and second light source units by detecting the luminance of inputted video signals; a first light source driving unit driving the first light source according to the control signal of the first light source unit; and a second light source driving unit driving the second light source by each block according to the control signal of the second light source unit. The luminance element of inputted video signal may be analyzed by each block, and the white LEDs turned on by each block if the luminance of the block is too low, thereby improving the light efficiency and color realization ratio.

A method for driving a backlight unit of an LCD device, the backlight unit including a plurality of red, green, blue and white LEDs, the plurality of red, green, blue and white LEDs being divided into a plurality of blocks, may include the acts of analyzing luminance of inputted video signal by each block; and turning on the white LEDs of the corresponding block when the analyzed luminance is below the predetermined reference value.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to examples of embodiments which are illustrated in the accompanying drawings. Wherever possible, the same reference numbers will be used throughout the drawings to refer to the same or like parts.

Hereinafter, a backlight unit of a Liquid Crystal Display ("LCD") device and a method for driving the same will be described with reference to the accompanying drawings.

Figure 1:
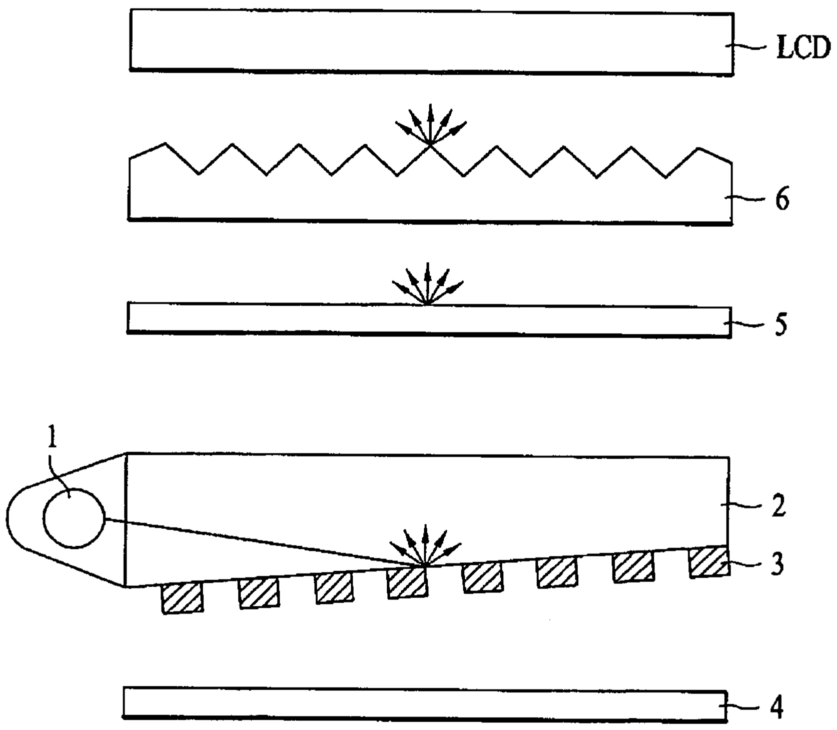
FIG. 1 Related Art
FIG. 1 is a schematic view for illustrating a backlight assembly according to the related art.
Figure 2:
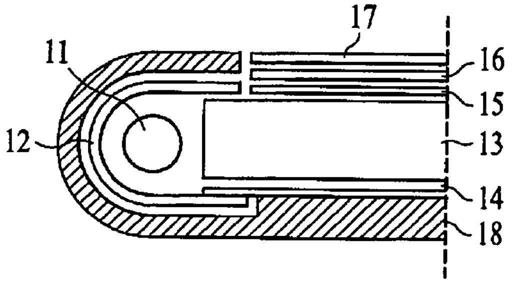
FIG. 2 Related Art
FIG. 2 is a cross sectional view for illustrating a backlight unit having a fluorescent lamp according to the related art.
Figure 3:
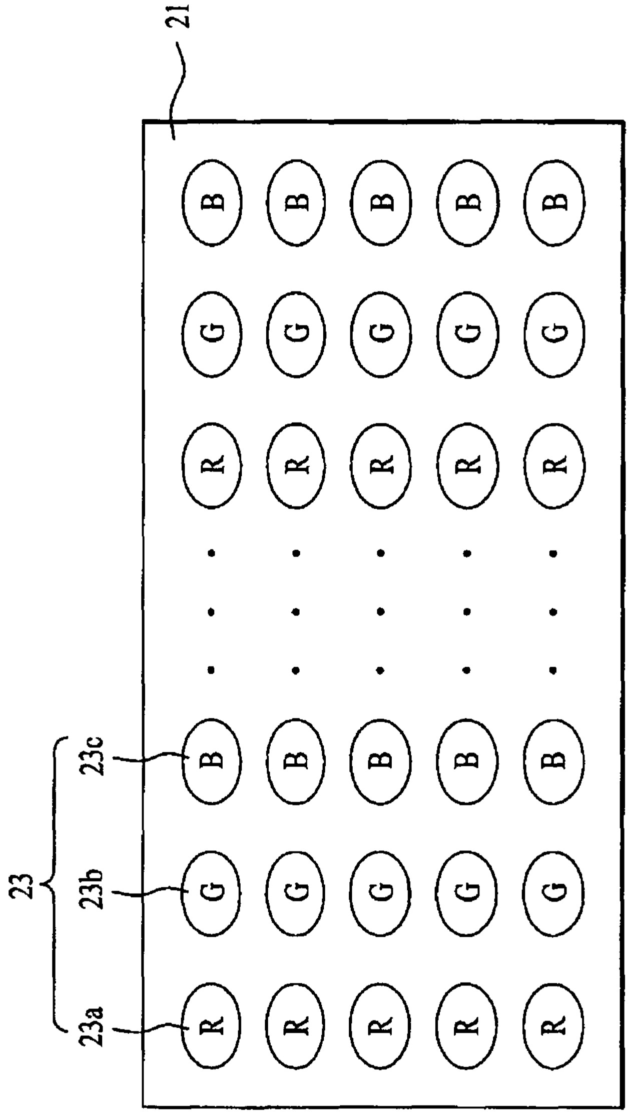
FIG. 3 Related Art
FIG. 3 is a cross sectional view for illustrating a backlight unit having an LED according to the related art.
Figure 4:
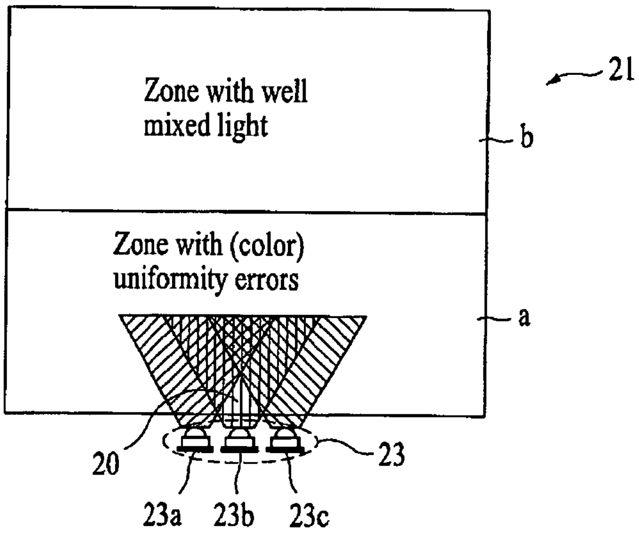
FIG. 4 Related Art
FIG. 4 is a plane view for explaining a method of emitting white light by mixing R, G and B light in a backlight unit having an LED according to the related art.
Figure 5:
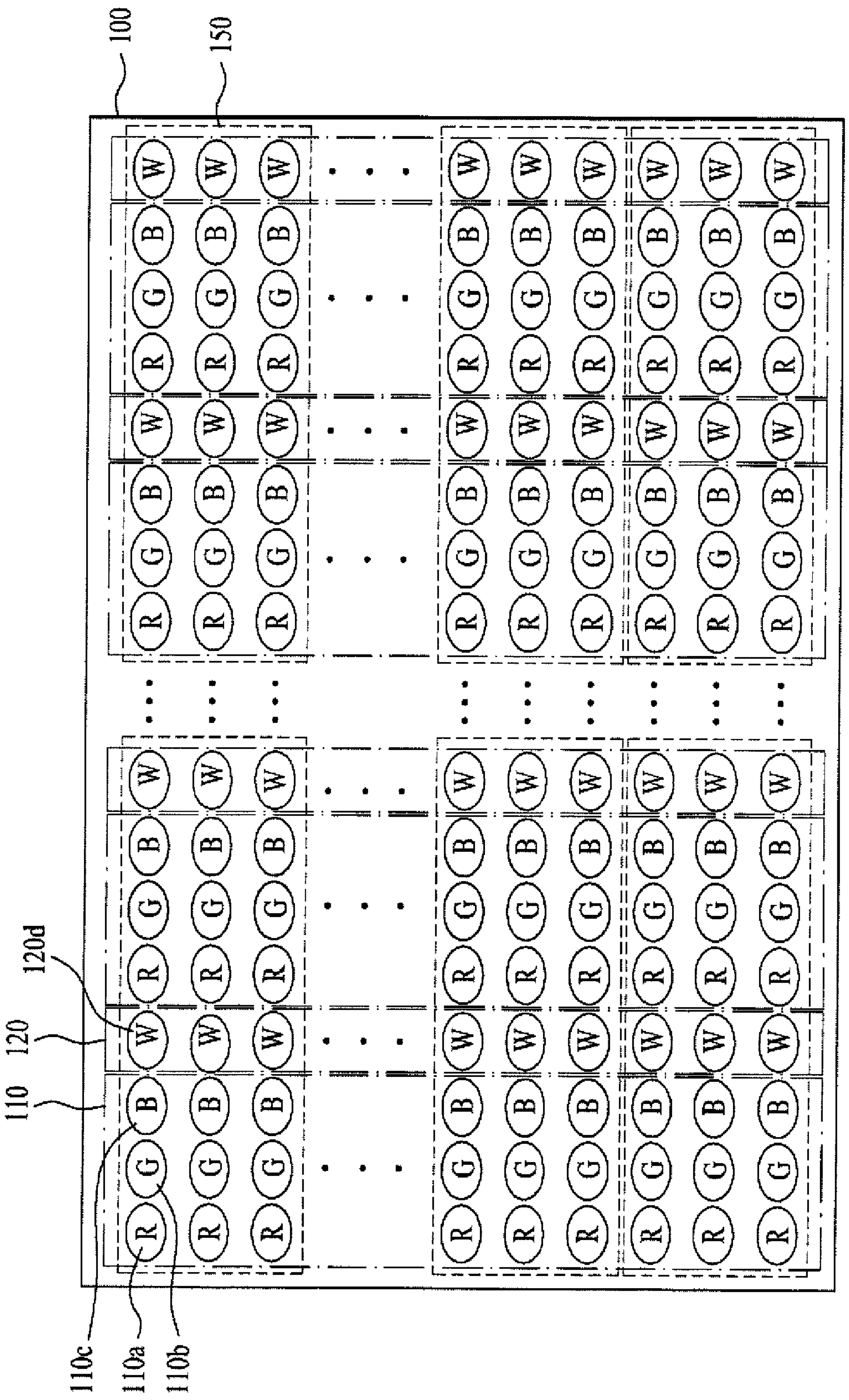
FIG. 5 is a plane view for illustrating a backlight unit of an LCD device according to the present invention.

FIG. 5 is a plane view for illustrating an example of a backlight unit of an LCD device according to the present invention.

As shown in FIG. 5, a plurality of red R, green G, blue B and white W LEDs are arranged at fixed intervals in one-dimensional structure on a PCB substrate 100 of a rear surface of an LCD panel (not shown). At this time, the backlight unit having the plurality of red R, green G, blue B and white W LEDs are divided into a plurality of blocks 150. As illustrated, the plurality of red R, green G and blue B LEDs are referred to as a first light source unit 110, and the plurality of white W LEDs are referred to as a second light source unit 120.

When displaying the image in the LCD device with the aforementioned backlight unit, red, green and blue light is emitted by operating the first light source unit 110 including the red LED, the green LED and the blue LED, and then the emitted light of red, green and blue is mixed, so that the white light is generated.

The red LED, the green LED and the blue LED of the first light source unit 110 may be operated to emit white light by mixing the red, green and blue color light. It may be difficult to provide the uniform white light to the LCD panel, thereby lowering the light efficiency and color realization ratio.

In an embodiment, when emitting the white light by mixing the red, green and blue color light, the luminance may be partially analyzed. Accordingly, when the analyzed value corresponds to the predetermined reference level, the second light source unit 120 may be partially operated to obtain the uniform white light, thereby improving the light efficiency and color realization ratio.

The white light incident on the LCD panel is controlled according to the alignment of liquid crystal, and is then transmitted through a color filter of an opposite substrate, thereby outputting the color image.

Figure 6:
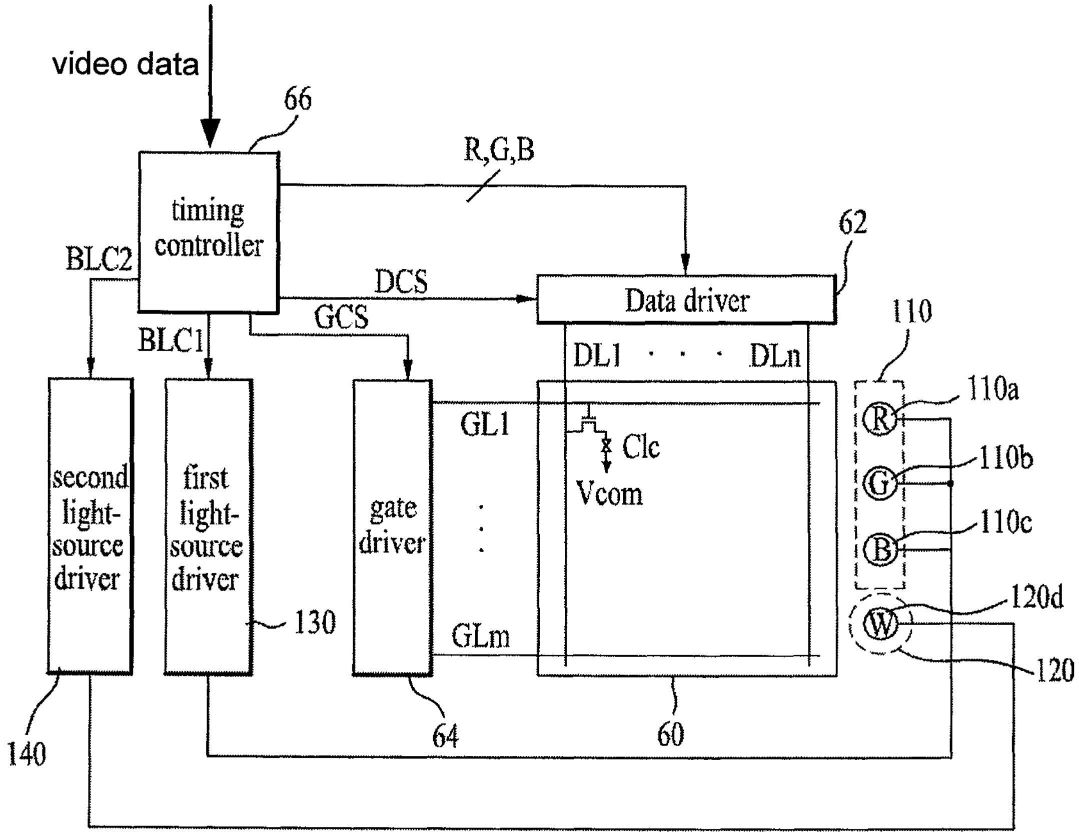
FIG. 6 is a schematic view for illustrating an LCD device according to the present invention.

FIG. 6 is a schematic view for illustrating an LCD device according to the present invention. As shown in FIG. 6, the LCD device may include an LCD panel 60, a data driver 62, a gate driver 64, first and second light source units 110 and 120, a timing controller 66, and first and second light source driving units 130 and 140. The LCD panel 60 may include a gate line GL, a data line DL and a thin film transistor TFT, wherein the gate line GL intersects the data line DL at the right angle, and the thin film transistor TFT is formed at the intersection point of the gate and data lines GL and DL. The data driver 62 provides data to the data line of the LCD panel 60. Also, the gate driver 64 provides a gate pulse to the gate line of the LCD panel 60. The first and second light source units 110 and 120 are formed on the rear of the LCD panel 60. Then, the timing controller 66 receives video data and synchronization signals H and V from a video system (not shown), and outputs control and video signals to the data driver 62 and the gate driver 64. Also, the timing controller 66 detects luminance signals by analyzing the video data inputted from the video system, and outputs control signals BLC1 and BLC2 for controlling the first and second light source units 110 and 120 according to the detected luminance signals. The first and second light source driving units 130 and 140 respectively drive the first and second light source units 110 and 120.

The LCD panel 60 includes a liquid crystal layer formed between two glass substrates. The thin film transistor TFT formed at the intersection point between the gate and data lines on the LCD panel 60 supplies data of the data line to liquid crystal cell Clc in response to a scanning pulse outputted from the gate driver 64. Then, a source electrode of the thin film transistor TFT is connected with the data line from the data driver 62, and a drain electrode of the thin film transistor TFT is connected to a pixel electrode of the liquid crystal cell Clc in the LCD panel 60. Also, a gate electrode of the thin film transistor TFT is connected with the gate line connected to the gate driver 64.

One video frame may be divided into three sub-frames of red R, green G and blue B, where the timing controller 66 supplies the control signal for driving the LCD panel 60 to the data driver 62 and the gate driver 64. For this, the timing controller 66 may rearrange digital video data, outputted from the video system (not shown), by each of red R, green G, blue B and white W colors. The Red Green Blue White ("RGBW") data rearranged by the timing controller 66 is provided to the data driver 62.

The timing controller 66 generates data control signal DCS and gate control signal GCS at a predetermined frequency suitable for a field sequence driving method by using the inputted horizontal and vertical synchronization signals H and V.

The data control signal DCS may include dot clock Dclk, source shift clock SSC, source enable signal SOE, polarity inversion signal POL, etc. and is provided to the data driver 62. Also, the gate control signal GCS may include gate start pulse GSP, gate shift clock GSC, gate output enable GOE, etc. and is provided to the gate driver 64.

The timing controller 66 may detect the luminance signal by analyzing the video data outputted from the video system, and control the first and second light source driving units 130 and 140 according to the detected luminance signal. That is, the first light source driving unit 130 maintains the high color realization ratio and the normal luminance uniformity according to the control signal of the timing controller 66, and controls also the entire R, G and B color by dimming.

Herein, the method for detecting the luminance signal in the timing controller 66 will be described in brief.

The timing controller 66 includes a luminance and color division unit and a histogram analyzing unit. Accordingly, the luminance and color division unit divides the first data (Ri, Gi, Bi) of the video system (not shown) into luminance element Y and chromatic elements U and V.

For example, the luminance element Y and chromatic elements U and V can be expressed by following equations of 1 to 3.

$$Y=0.229\times Ri+0.587\times Gi+0.114\times Bi \qquad \text{equation 1}$$

$$U=0.493\times(Bi-Y) \qquad \text{equation 2}$$

$$V=0.887\times(Ri-Y) \qquad \text{equation 3}$$

Figure 7:
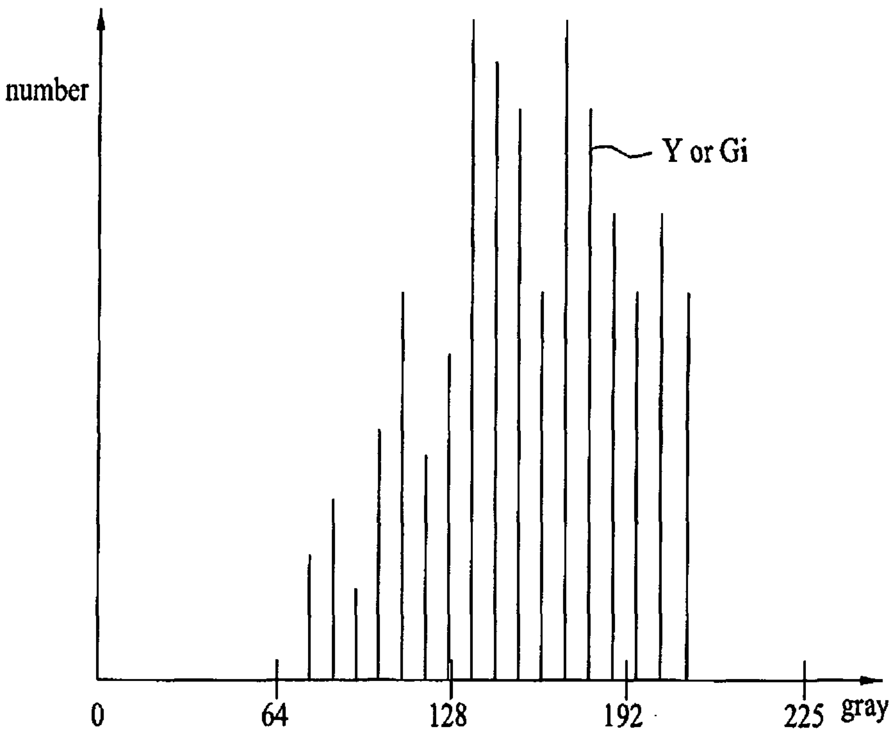
FIG. 7 is a graph for illustrating a luminance analyzing process in a histogram analyzing unit according to the present invention.

FIG. 7 is a graph for illustrating a luminance analyzing process in a histogram analyzing unit according to the present invention. The histogram analyzing unit divides the luminance element Y by each gray scale of a frame. That is, the histogram analyzing unit arranges the luminance element Y in correspondence with each gray scale by frame, thereby obtaining the histogram of FIG. 7. At this time, it is possible to get the information for the brightness of the image by analyzing the histogram. For example, if the histogram leans toward the right side (high gray), it is the bright image. In the meantime, if the histogram leans toward the left side (low gray), it is the dark image. The histogram analyzing unit gets the information for the brightness of the present frame (the minimum value of brightness, the maximum value, and the average value) by analyzing the histogram of showing the luminance element Y of one frame. Also, the timing controller 66 supplies the control signal corresponding to the obtained information for the brightness of the present frame to the second light source driving unit 140. At this time, as the brightness information of the histogram is great, the control signal is controlled such that the high driving voltage (driving current) is provided to the backlight.

To help the color mixing of the light emitted from the respective LEDs driven by the first light source driving unit 130, and to control the peak luminance in the predetermined portion, it is possible to control the partial luminance by the dimming control of the second light source driving unit 120.

Accordingly, although not shown, the second light source driving unit 140 turns on the plurality of white W LEDs 120*d* by each of the blocks explained in FIG. 5. That is, during the liquid crystal response block when the data is provided to and maintained in the liquid crystal cell in each subframe by the control signal BLC1 of the timing controller 66, the first light source driving unit 130 turns on the first light source unit 110 including the red R LED 110*a*, the green G LED 110*b* and the blue B LED 110*c*. According to the control signal BLC2 of the timing controller 66, the second light source driving unit 140 turns on the second light source unit 120 including the white W LED 120*a* by block.

The data driver 62 samples the data according to the data control signal DCS outputted from the timing controller 66, and latches the sampled data by each line, and then converts the latched data to an analog gamma voltage of a gamma voltage supplying unit (not shown).

The gate driver 64 includes a shift register and a level shifter. The shift register sequentially generates gate pulses in response to the gate start pulse GPS of the gate control signal GCS. The level shifter shifts the voltage of gate pulse to the voltage level suitable for driving of liquid crystal cell.

An embodiment of the backlight unit of the LCD device may include the first light source unit 110, the second light source unit 120, and the first and second light source driving units 130 and 140. The first light source unit 110 is formed of at least one red R LED 110*a*, green G LED 110*b* and blue B LED 110*a* to emit the white W light to the LCD panel. Also, the second light source unit 120 is formed of at least one white W LED 120*d*. The first and second light source driving units 130 and 140 are provided to drive the respective first and second light source units 110 and 120.

In case the LCD device realizes the color image of the same luminance, the white LEDs may be additionally provided in correspondence with the red, green and blue LEDs.

When emitting the white light by mixing the light of red, green and blue color, the partial luminance is analyzed with the timing controller 66. In this state, if the analyzed luminance is below the predetermined reference value, the timing controller 66 controls the second light source driving unit 140, whereby the white W LEDs 120*d* are selectively turned on by each block. As a result, it is possible to improve the color mixing of the red, green and blue light, and to improve the entire luminance.

An embodiment of the LCD device may be placed on a PCB substrate having the first light source unit and the second light source unit, wherein the first light source unit is comprised of red R LED 110*a*, the green G LED 110*b* and the blue B LED 110*c*, and the second light source unit is comprised of the white W LED 120*a*. In this state, the white W LEDs 120*d* are turned on by each block. Accordingly, the LED panel is illuminated with the uniform white light, so that it is possible to improve the light efficiency and color realization ratio.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight unit of an LCD device that receives video data, comprising:

a printed circuit board (PCB) substrate facing a rear surface of an LCD panel and extending along the rear surface of the LCD panel;

a plurality of first light source units including a plurality of red, green and blue LEDs;

a plurality of second light source units corresponding to the plurality of first light source units and including a plurality of white LEDs, wherein the plurality of the first light source units and the plurality of the second light source units are positioned alternately on the PCB substrate, wherein the plurality of red, green, blue and white LEDs being divided into a plurality of blocks, wherein each block includes red, green, blue and white LEDs, wherein the red, green and blue LEDs evenly spread across the PCB substrate to form an array of LEDs including a plurality of rows and columns;

a control unit that outputs a first control signal to the first light source units and a second control signal to the second light source units based upon a luminance signal, wherein the control unit detects the luminance signal by analyzing inputted video data from a video system by each block, and the control unit includes a histogram analyzing unit that analyzes the luminance of white light emitted from the first light source units in accordance with a histogram containing luminance values for each gray scale of a video frame to obtain an analyzed luminance;

a first light source driving unit that drives the first light source units according to the first control signal; and a second light source driving unit that drives the second light source units by each block according to the second control signal;

wherein the second light source driving unit selectively drives the white LEDs of a corresponding block so that the white LEDs of the corresponding blocks are turned on in case where the detected luminance signal of the corresponding block is below a predetermined reference value, thereby a white light emitted from the white LEDs in the corresponding block is mixed with a white light emitted from the first light source units in the corresponding block to improve entire luminance of the white light and to achieve a uniform white light in the entire backlight unit;

wherein the white LEDs emit the white light after a white light is emitted from the first light source units and after luminance of the white light emitted from the first light source units is analyzed;

wherein the video frame is divided into three sub-frames of red, green and blue;

wherein the first light source driving unit turns on the first light source units during a liquid crystal response block when the video data is provided to and maintained in a liquid crystal cell in each sub-frame by the control signal of the first light source unit;

wherein the control unit detects the luminance signals by analyzing the video data;

wherein the control unit comprises a luminance and color division unit and a histogram analyzing unit, the luminance and color division unit divides the video data into luminance element and chromatic elements.

2. A method for driving a backlight unit of an LCD device that receives video data from a video system, comprising:

preparing the backlight unit which includes a plurality of first light source units including a plurality of red, green and blue LEDs, a plurality of second light source units including a plurality of white LEDs, wherein the plurality of the first light source units and the plurality of the second light source units being positioned alternately, wherein the plurality of red, green, blue and white LEDs being divided into a plurality of blocks, wherein each block includes red, green, blue and white LEDs, wherein the red, green and blue LEDs evenly spread across a PCB substrate;

providing the PCB substrate along a rear surface of the LCD panel;

providing the plurality of first and second light source units on the PCB facing the rear surface of an LCD panel to form an array of LEDs including a plurality of rows and columns;

detecting a luminance signal by analyzing the video data for each block using a controller;

driving the first light source units to emit white light according to the detected luminance signal;

analyzing luminance of the white light emitted from the first light source units according to a histogram containing luminance values for each gray scale of a video frame to obtain an analyzed luminance; and selectively turning on the white LEDs of a corresponding block after the white light is emitted from the first light source units and after luminance of the white light emitted from the first light source units is analyzed when the analyzed luminance of the corresponding block is below a predetermined reference value;

mixing white light emitted from the white LEDs with the white light emitted from the first light source units in the corresponding block to improve entire luminance of the white light and to achieve a uniform white light in the entire backlight unit.

* * * * *